INVENTORS
JAMES E. BROWNING &
DAVID HULL YOUNGBLOOD
BY
Mason, Fenwick & Lawrence
ATTORNEYS INVENTORS
JAMES E. BROWNING &
DAVID HULL YOUNGBLOOD
BY
Mason, Fenwick & Lawrence
ATTORNEYS INVENTORS
JAMES E. BROWNING &
DAVID HULL YOUNGBLOOD
BY
Mason, Fenwick & Lawrence
ATTORNEYS INVENTORS
JAMES E. BROWNING &
DAVID HULL YOUNGBLOOD
BY
Mason, Fenwick & Lawrence
ATTORNEYS INVENTORS
JAMES E. BROWNING &
DAVID HULL YOUNGBLOOD
BY
Mason, Fenwick & Lawrence
ATTORNEYS

KEYLESS OPERATING AND LOCKING MECHANISM FOR CELL DOORS

Filed June 30, 1965

INVENTORS
JAMES E. BROWNING &
DAVID HULL YOUNGBLOOD
BY
Mason, Fenwick & Lawrence
ATTORNEYS INVENTORS
JAMES E. BROWNING &
DAVID HULL YOUNGBLOOD
BY
Mason, Fenwick & Lawrence
ATTORNEYS INVENTORS
JAMES E. BROWNING &
DAVID HULL YOUNGBLOOD
BY
Mason, Fenwick & Lawrence
ATTORNEYS

KEYLESS OPERATING AND LOCKING MECHANISM FOR CELL DOORS

Filed June 30, 1965

INVENTORS
JAMES E. BROWNING &
DAVID HULL YOUNGBLOOD
BY
Mason, Fenwick & Lawrence
ATTORNEYS United States Patent Office 3,343,302

Patented Sept. 26, 1967

3,343,302

KEYLESS OPERATING AND LOCKING MECHANISM FOR CELL DOORS

James E. Browning and David Hull Youngblood, San Antonio, Tex., assignors to Southern Steel Company, San Antonio, Tex., a corporation of Texas Filed June 30, 1965, Ser. No. 468,490
9 Claims. (Cl. 49—18)

ABSTRACT OF THE DISCLOSURE

A cell door drive system having automatic blockage detecting means for opening switches to cut off power to the door drive when the door is blocked by an obstruction.

This invention is related in general to keyless door operating and locking mechanisms and is specifically related to power driven cell door systems having individual motor driven doors. The primary elements of the invention consist of a sliding door supported for reciprocation and connected to a drive head which is in turn connected to a trunnion assembly threaded onto a drive screw which is drivingly rotated by an electric motor. The drive head is disconnectable from the trunnion by manually operable override means and switch means are incorporated in the door support assembly to detect blockage of the door so as to cut off power to the driving motor to prevent burning out of the motor. Each switch is fixedly mounted on the supporting assembly and is activated by a pivotable switch cut off bar upon the detection of door blockage. The cut off bars are actuated by a pivotable movement of a rotatable lever means carried on the drive head and engaging each cut off bar. The afore-discussed structure embodied in this invention enables the achievement of the following recited objects of this invention in an efficient, completely safe, rugged and economical manner.

It is, therefore, an object of this invention to provide a greatly improved and simplified machanism employing individual motors for actuating a cell door system and to provide associated manually operable means readily accessible at a remote location to temporary disengage the cell door from the drive means in an emergency, arising from power failure or other causes.

Another object of this invention is the provision of a keyless operating and locking mechanism for cell doors in which each cell door in a bank or series of cells may be unlocked remotely in case of emergency without the necessity of disconnecting each individual door separately.

Yet another object of this invention is the provision of a keyless operating and locking mechanism for cell doors employing individual reversible electric motors driving ball bearing screw and nut actuators connected to the doors, so that all of the doors may be released from the drive means by an emergency manual release means in the event emergency action is needed even though the doors may be in an opened, locked or transit condition, thereby allowing each door to be individually reciprocated at the cell.

Still another object of this invention is the provision of a keyless operating and locking mechanism for cell doors employing individual motors for actuating the cell door whereby, if the door is blocked during a period of transit, the electric power to the motor is automatically interrupted thereby protecting the motor from the damage due to overheating.

Another object of this invention is the provision of electrically operated cell doors which, when blocked during transit, will remain at that point of travel and cannot be opened or closed from the vicinity of the door until remote releasing means are activated or until the blockage is removed.

A further object of this invention is the provision of individually electrically operated cell doors having means, which if the door is in a blocked condition, prevents the direction of movement from being reversed at the door, but still allowing the door movement to be reversed at a remote control point.

A still further object of this invention is the provision of cell doors whereby, if the door is blocked during transit, means are provided to automatically stop the door driving means until the blockage is removed and then engaging the door once again with the driving means so as to continue to drive the door in the original transit direction.

Other objects, advantages and capabilities of the invention will become apparent from the following description, taken in conjunction with the accompanying drawings showing only a preferred embodiment of the invention.

Figure 1:
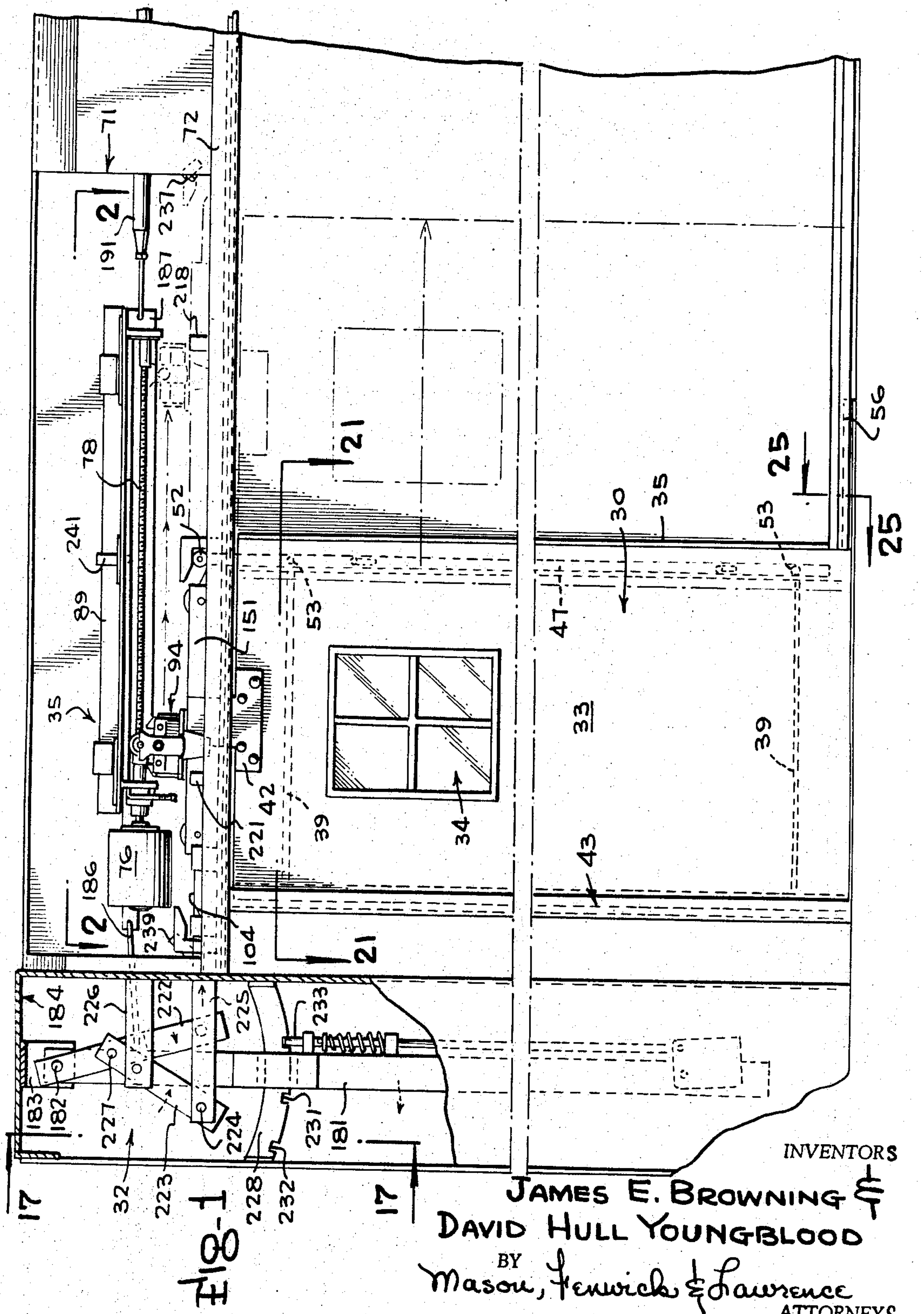
FIGURE 1 is a front elevation view of the present invention with the operative parts in a closed and locked condition.
Figure 2:
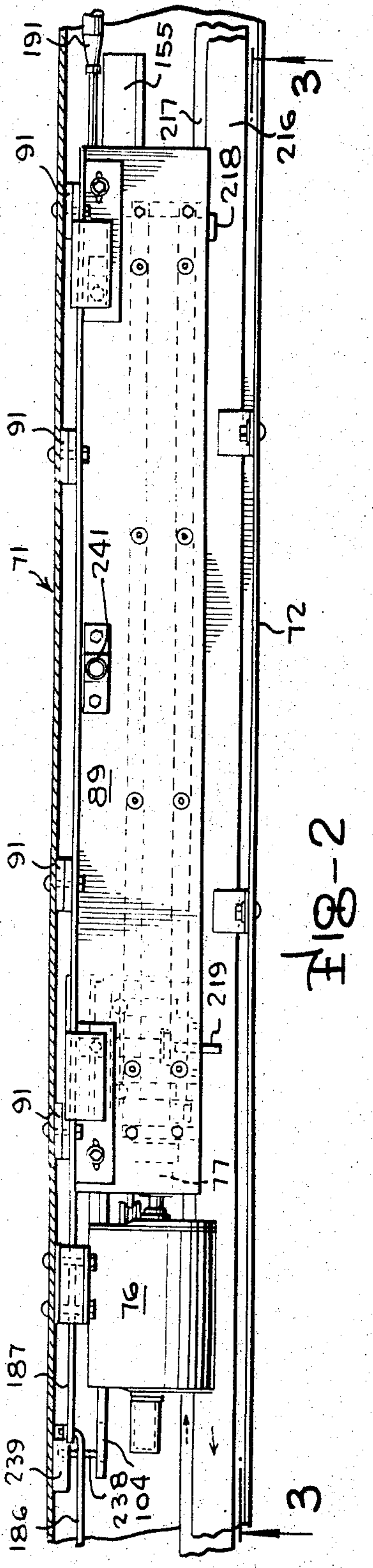
FIGURE 2 is a horizontal section view taken along lines 2—2 of FIGURE 1.
Figure 3:
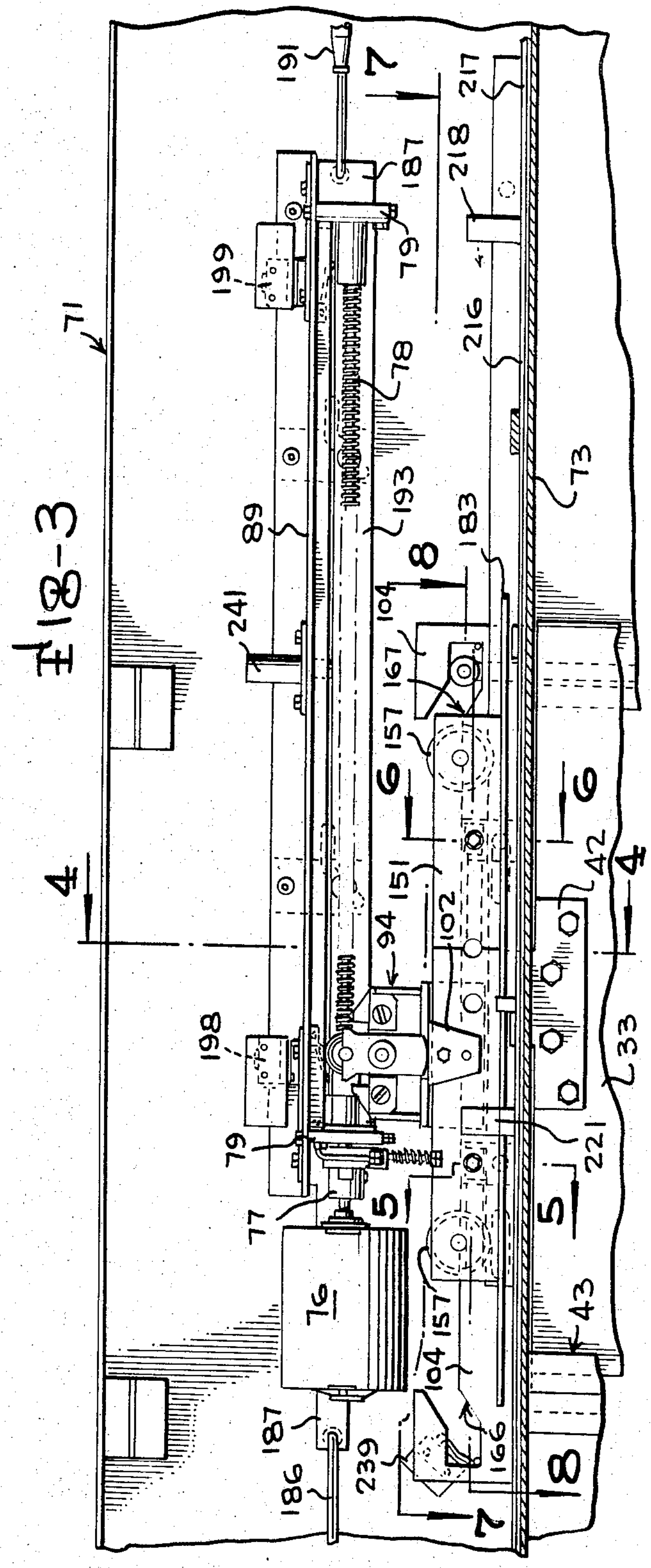
FIGURE 3 is a fragmentary front elevation view similar to that of FIGURE 1; however, showing more detail.

Referring to the drawings wherein like reference characters designate corresponding parts throughout the several figures, and especially to FIGURE 1, the present invention may be broken down into three main categories comprising a door assembly 30, a driving mechanism 31 and an emergency manual release mechanism 32.

Referring now especially to FIGURES 20 through 25, the door assembly 30 generally comprises a door 33 of suitable configuration, and in the present invention it has been shown to be one of metal plate having a window 34. This type of door is commonly used in the newer prisons. The door 31 has on one side a lock bar housing cover plate 35 which runs generally the entire length of the door. Spaced inwardly toward the center of the door from the lock bar housing cover plate is a piece of angled material 36 which serves as a locking jamb. Near the extreme ends of the locking jamb 36 are locking lug recesses 37 having a purpose to be yet described. At the side of the door opposite the housing cover plate is an angled member 38 serving as a cover plate for the locking lug recesses. Stretching transversely across the door near the top and bottom thereof, are latching members 39 each having an open door recess 41 near the locking lug recess cover plate 38. The door 33 is hung from the top by a door hanger 42 which is affixed at its other end to portions of the driving mechanism 31.

The wall mounted portions of the door assembly 30 generally comprise a door jamb 43 having a channel shaped member 44 which accepts the leading edge of the door 33 when in a closed position. The door jamb 43 is suitably affixed to the cell wall 45. Also affixed to the cell wall at the other side of the cell opening is a lock bar housing 46 which encloses the vertically moving lock bar 47. The lock bar 47 is affixed for vertical movement within the channel portion of the lock bar housing 46 by a pair of lock bar guide studs 48 which project through the guide slots 49. The lock bar 47 is maintained upon the guide studs 48 by means of a lock washer 51. As is evident, the lock bar 47 will reciprocate vertically to the extent allowed by the guide slots 49. At the top of the lock bar is a rotatably mounted lock bar roller 52. Intermediate the ends of the lock bar 47 are a pair of locking lugs 53 which cooperate with the locking jamb 36 when the door is in a closed position to prevent movement of the door. When the door is in an open position, the locking lugs are engaged within the open door recesses 41 to prevent the door from being reciprocated in the open position. Therefore, when the door is in either terminal position, it is maintained in that position by means of the lock bar 47 cooperating with either the locking jamb 36 or the open door locking recess 41 as the case may be. At the bottom of the door 33 is a door guide 54 having an upturned flange 55 that cooperates in overlapping relation with the wall mounted door guide 56 and its associated downwardly turned flange 57.

Figures 4, 5, 6:
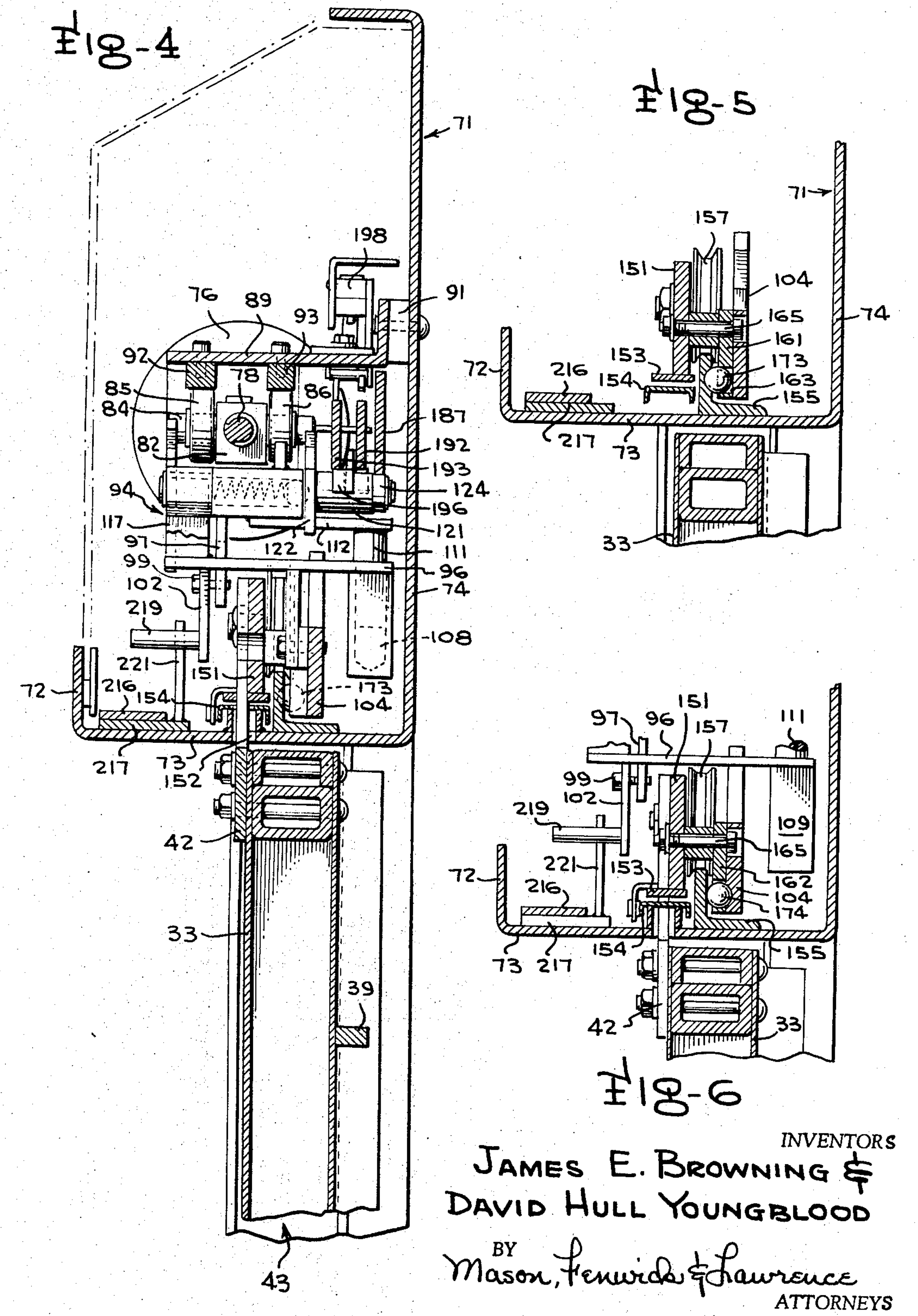
FIGURE 4 is a vertical section view taken along lines 4—4 of FIGURE 3.
FIGURE 5 is a vertical section view taken along lines 5—5 of FIGURE 3.
FIGURE 6 is a vertical section view taken along lines 6—6 of FIGURE 3.
Figure 7:
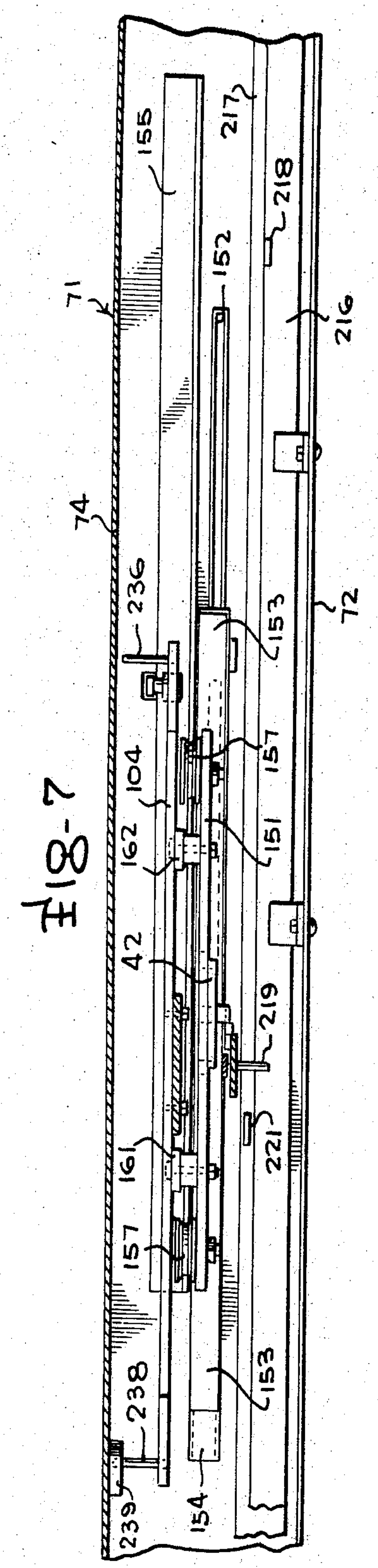
FIGURE 7 is a horizontal section view taken along lines 7—7 of FIGURE 3.
Figure 8:
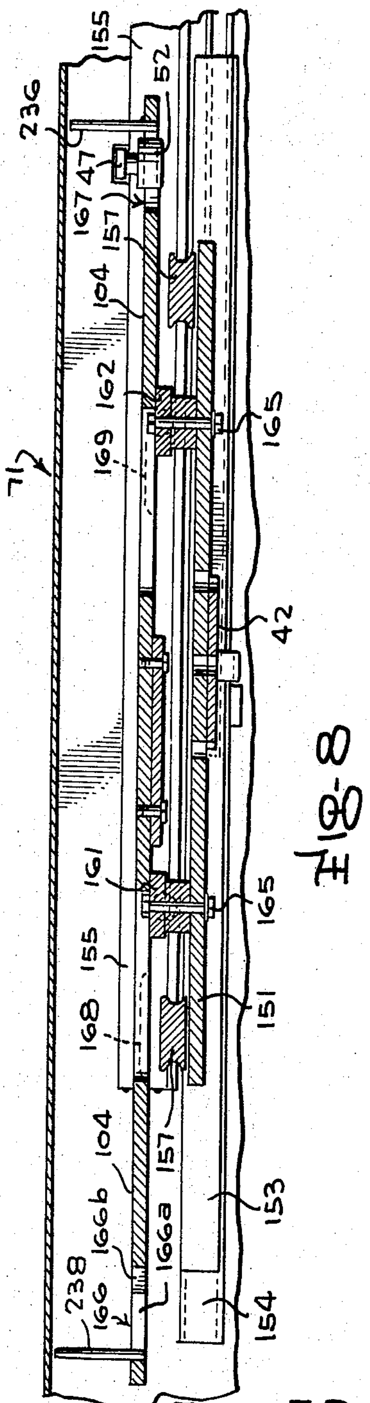
FIGURE 8 is a horizontal section view taken along lines 8—8 of FIGURE 3.
Figure 9:
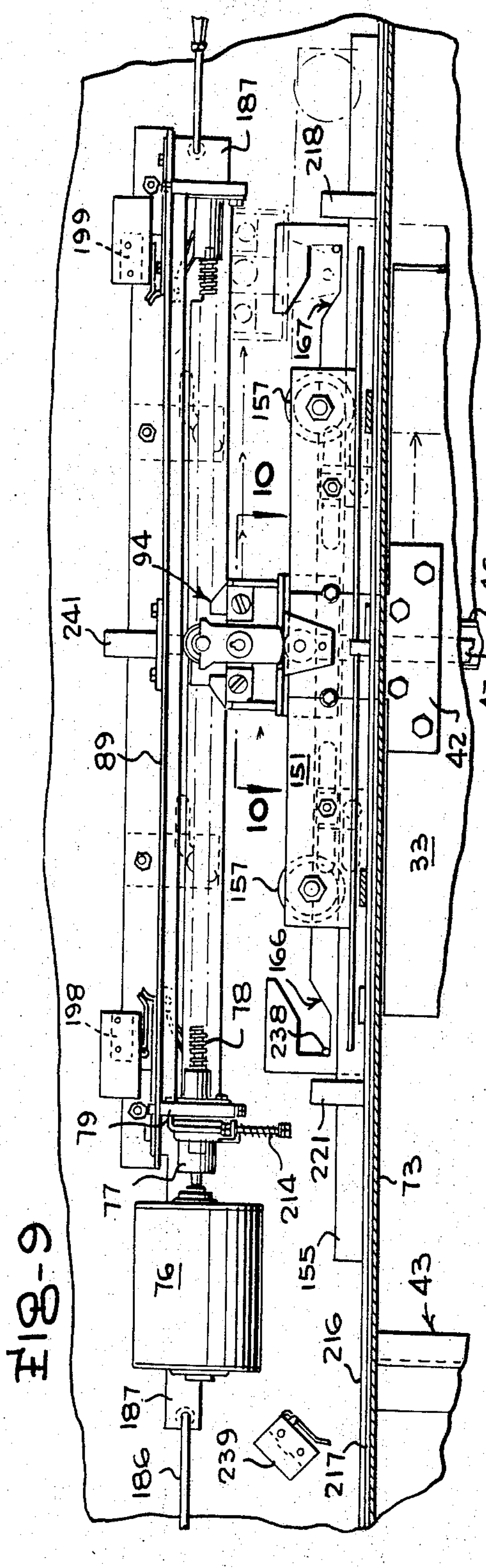
FIGURE 9 is a fragmentary front elevation view similar to that of FIGURE 3; however, showing the operative parts in an unlocked condition and moved to an intermediate position of travel with the position of the door open and locked shown in the phantom lines.
Figures 10, 11:
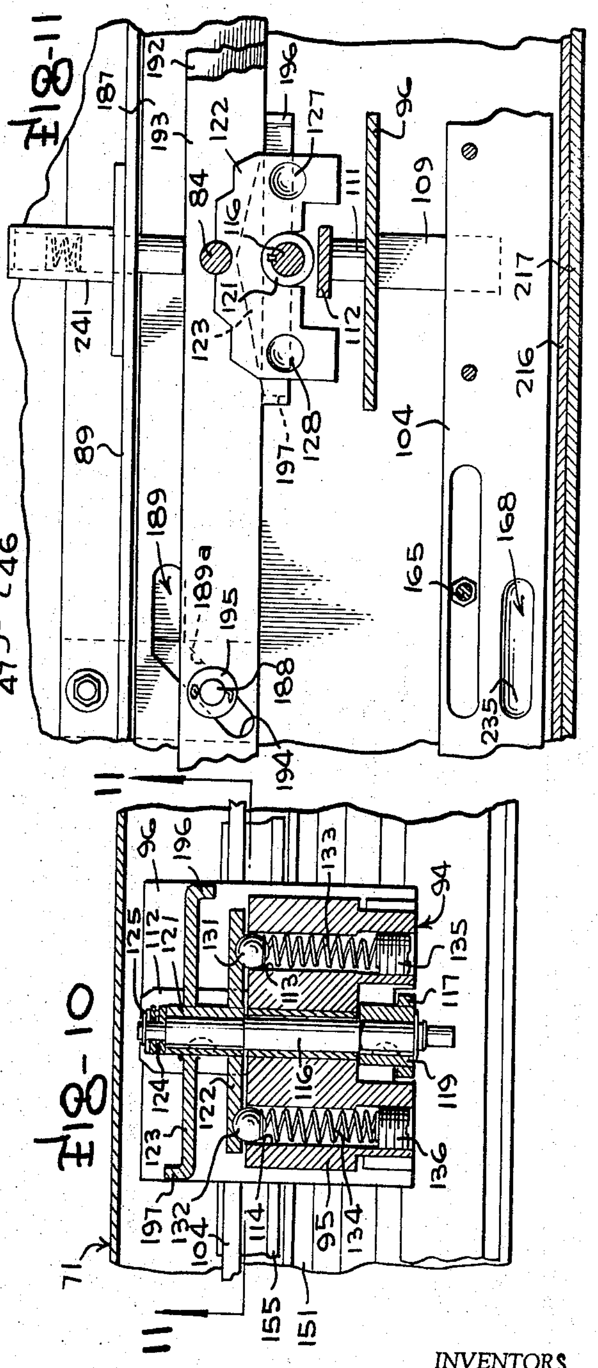
FIGURE 10 is a horizontal section view taken along lines 10—10 of FIGURE 9.
FIGURE 11 is a horizontal section view taken along lines 11—11 of FIGURE 10.

Referring now to the driving mechanism 31 and especially to FIGURE 4, it is seen that the driving mechanism is suitably enclosed in a housing 71. The housing includes a structural member having a housing front 72, a housing floor 73, and a rear wall 74. The front portion of the housing 71 has a removable housing access panel 75 which may be easily removed from the exterior of the cell so that the operative parts of the driving mechanism may be serviced. The driving mechanism 31 is operated by means of individual reversible electric motors 76. The motor 76 is connected, by means of a coupling 77, to a drive screw 78 which is supported by bearing housings 79 located at the remote ends of the drive screw. In accordance with the invention, each door 33 is operated by the electric motor 76 having the drive screw 78 driven through the coupling 77 wherein the drive screw carries a ball bearing drive screw nut 82 of a well-known type, and which may be similar to the one shown in U.S. Patent No. 2,380,662. The drive screw nut 82 is part of a trunnion assembly 83 that includes a trunnion shaft 84 and a pair of trunnion rollers 85, 86. The rollers 85 and 86 are maintained upon the trunnion shaft 84 by means of a split ring washer 87 engaging the retainer slot 88. As the drive screw 78 is rotated, it necessarily follows that the trunnion assembly 83 will be propelled along the drive screw.

Maintaining the drive screw in a fixed position is the drive screw support 89 which is affixed by means of a plurality of drive screw support hangers 91 affixed to the rear wall 74 of the housing 71. Depending downwardly from the drive screw support are the bearing housings 79 and 81, and also a pair of spaced parallel trunnion roller guides 92, 93. The trunnion rollers 85, 86 are adapted to roll against their respective roller guides 92, 93 thereby driving the trunnion along a predetermined path. Interconnecting the driven trunnion 83 with the door 33 which is to be driven, is a drive head 94. The drive head 94 comprises a drive head body 95 mounted for relative vertical movement with respect to the drive head support platform 96. The drive head body 95 is maintained in operative relation with the support platform 96 by means of a body guide 97 which projects downwardly from the bottom of the body 95 through the body guide slot 98 and engages a retaining lug 99 within the body guide recess 101. The vertical movement of the drive head body 95 is limited by the length of the recess 101, as it cooperates with the retaining lug 99. The retaining lug 99 is maintained in proper position since it is affixed to the release pin support 102. The pin support 102 depends downwardly from the drive head support platform 96 to which it is joined adjacent the body guide slot 98. Also depending from underneath the drive head support platform 96 is a drive head support hanger 103 which is adapted to mount the propelling bar 104. The drive head body 95 is additionally maintained in the proper position by means of flanking guides 105 and 106, which extend upwardly from the support platform adjacent the sides of the drive head body to prevent any pivotal motion of the body 95 during operation of the invention. The drive head body 95 is maintained in an upwardly biased position by the bias spring 107 received at one end by the spring guide recess 108 in the spring guide 109 and at the other end within the spring plunger 111 which is also adapted to be received within the spring recess 108 thereby maintaining the spring 107 in a compressed state. The spring plunger 111 is connected to the drive head body 95 by the spring plunger support 112. The drive head body 95 has three parallel apertures located therein with the two outer most apertures being identified as ball recesses 113 and 114. The center most apertures 115 supports the rocker shaft 116. The rocker shaft 116 extends through the aperture 115 so that a portion of the shaft remains exteriorly of the drive body 95. At one end of the rocker shaft a drive rocker 117 is keyed to the rocker shaft. The drive rocker 117 is normally a vertically positioned member of elongated configuration having at one end a trunnion shaft notch 118 adapted to receive the trunnion shaft 84 that projects outwardly from trunnion roller 85. The drive rocker 117 is keyed to the rocker shaft by means of a stub 119 engaging the rocker shaft in the normal manner. The remaining free end of the rocker shaft has keyed to it, by stub shaft 121, an oscillating rocker 122 and a rocker arm 123. The last mentioned members are permanently affixed to stub shaft 121 and are adapted to pivot concurrently upon shaft 116. The outer most end of the rocker shaft 116 has rotatably mounted thereon a roller 124 which is maintained upon the shaft by means of a friction washer 125. The oscillating rocker 122 is generally a flat member having trunnion shaft notch 126 along its upper edge and receiving the end of the trunnion shaft 84 which projects outwardly from trunnion roller 86. In the flat face of the oscillating rocker 122, which faces toward the drive head rocker 95, are a pair of ball detents 127, 128. The ball detents are adapted to cooperate with the oscillating rocker balls 131, 132. The balls 131, 132 are maintained within the ball detents by means of compression springs 133, 134 which are received within the ball recesses 113, 114 respectively. Maintaining the springs in compression against the balls 131, 132 are the ball pressure adjusting screws 135, 136. These screws are threadingly engaged with their respective recesses 113, 114 on the side of the drive head body 95 remote from the oscillating rocker 122. By adjusting the screws 135, 136, a desired amount of pressure may be maintained against the oscillating rocker balls, thereby precisely determining the pivotal pressure required by the rocker shaft 116 to pivot the oscillating rocker so as to expel the rocker balls from the ball detents.

Figure 18:
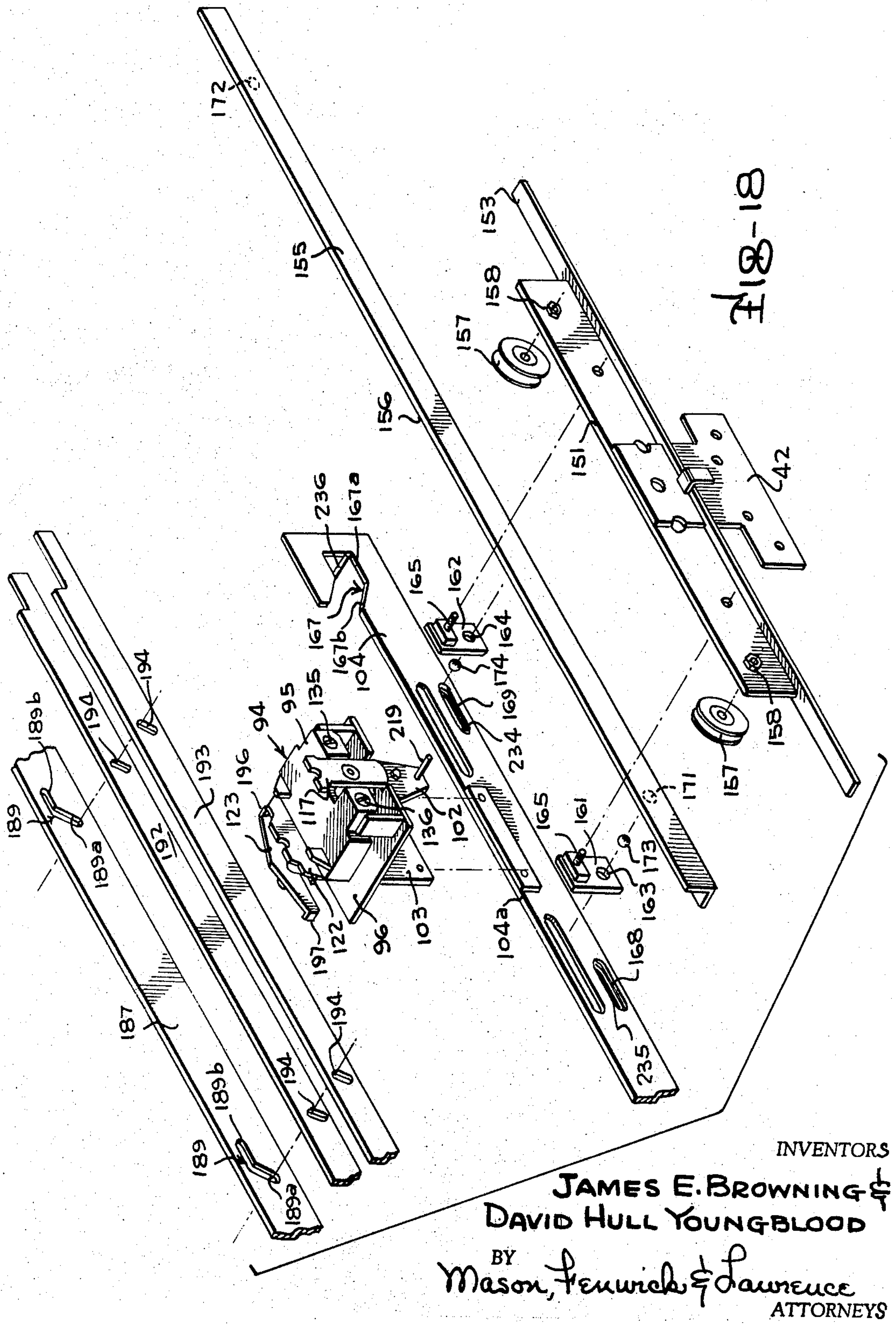
FIGURE 18 is an exploded perspective view of the door carrying mechanism and a portion of the emergency manual release mechanism.
Figure 19:
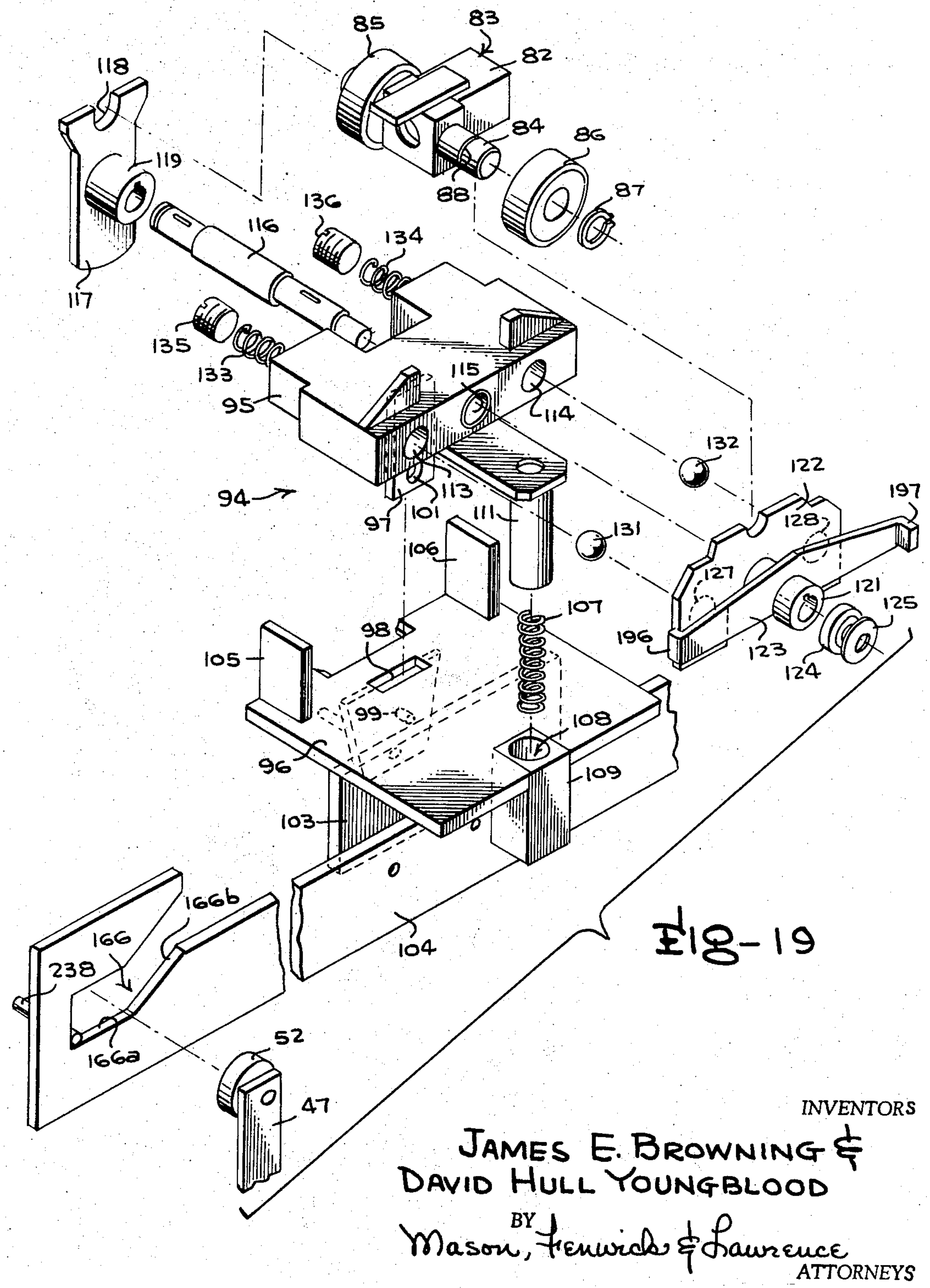
FIGURE 19 is an exploded perspective view of the door driving head mechanism.
Figure 21:
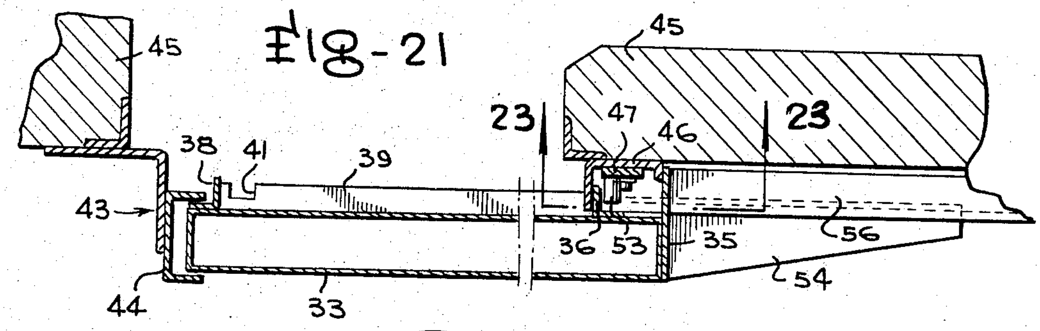
FIGURE 21 is a horizontal section view taken along lines 21—21 of FIGURE 1 showing the door closed and locked.
Figure 20:
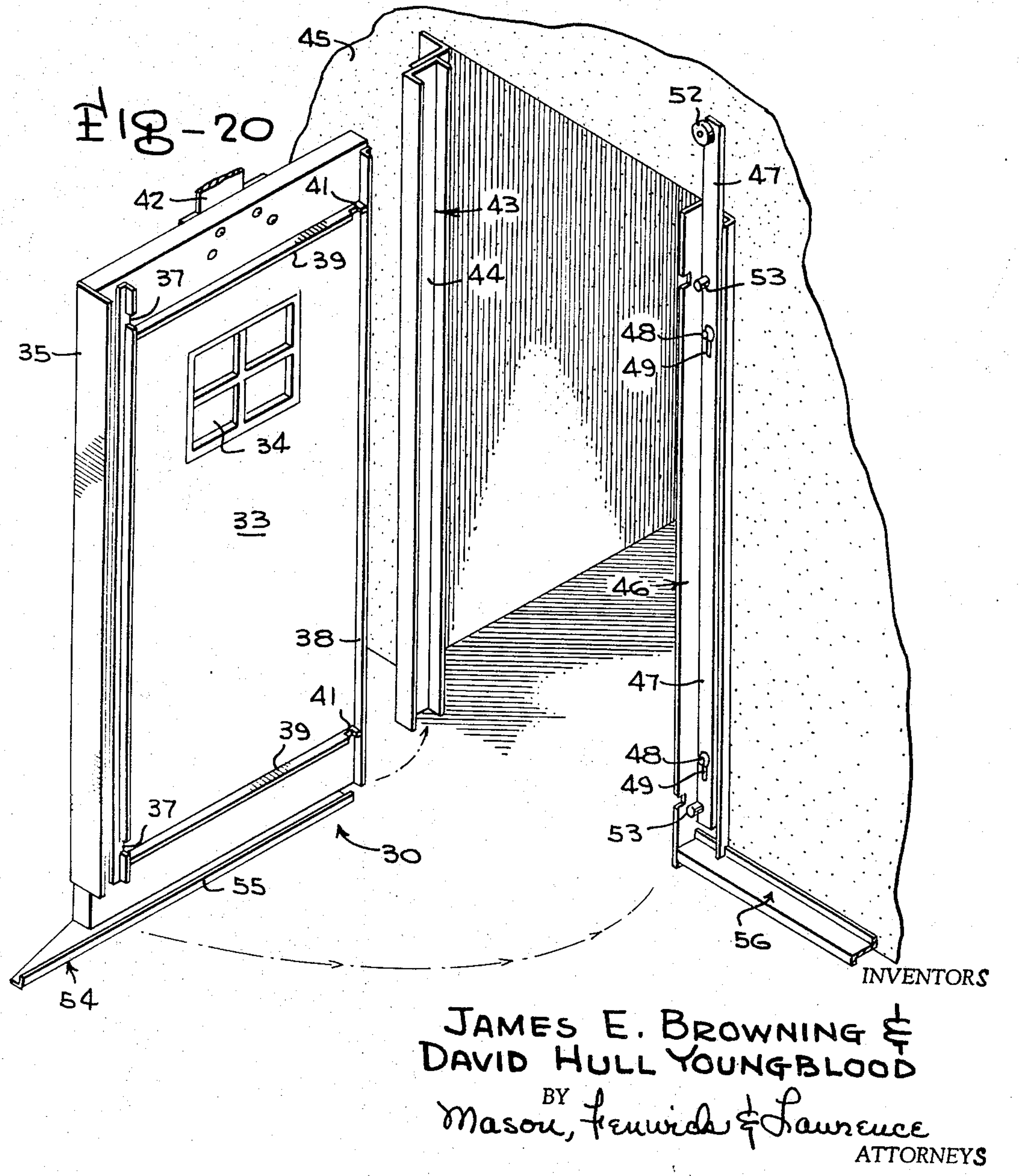
FIGURE 20 is a perspective view of the door exploded from the door carrier and track mechanism.
Figure 22:
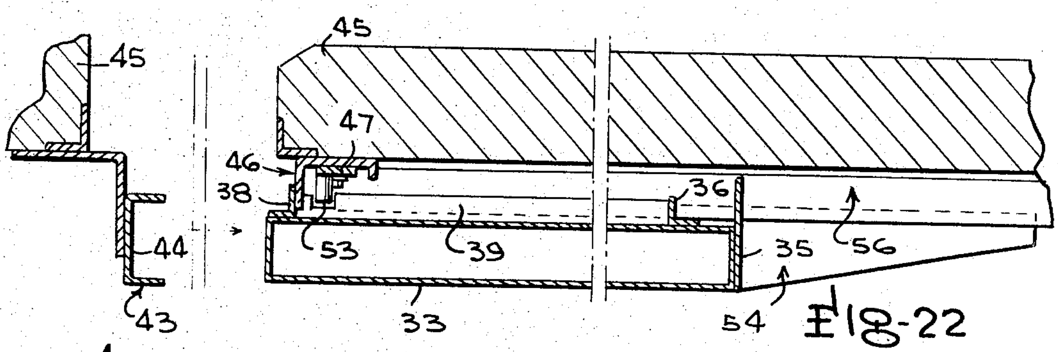
FIGURE 22 is a view similar to FIGURE 21; however, showing the door in the open position and locked.
Figure 23:
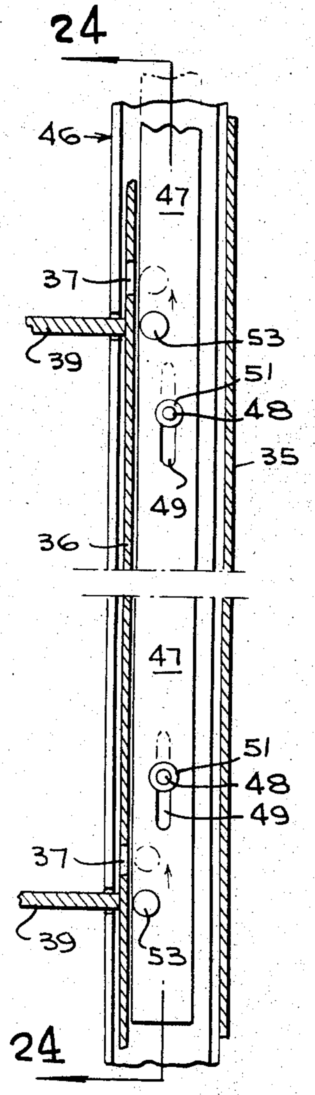
FIGURE 23 is a horizontal section view taken along lines 23—23 of FIGURE 21.
Figure 24:
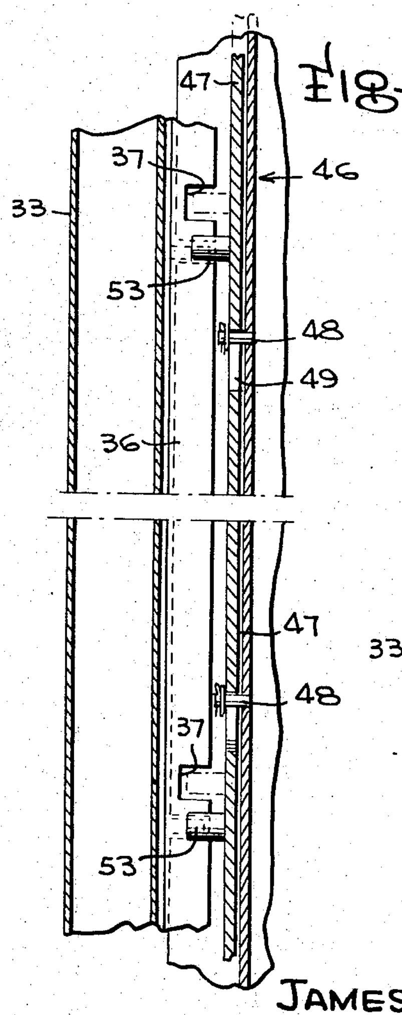
FIGURE 24 is a vertical section view taken along lines 24—24 of FIGURE 23.
Figure 25:
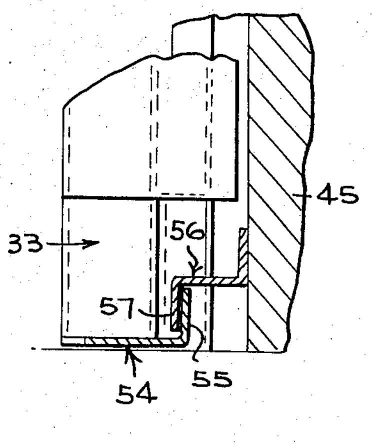
FIGURE 25 is a vertical section view taken along lines 25—25 of FIGURE 1.

Referring now to FIGURE 18 there is shown a door carriage mechanism which imparts movement to the door 33 when the drive head 94 is caused to reciprocate along the drive screw 78. The movement of the drive head 94 is transmitted to the propelling bar 104 since, as it was stated before, the propelling bar is securely mounted to the drive head. Located outwardly from the propelling bar toward the housing front 72 is a door carrier bar 151 to which the door hanger 42 is attached. The door hanger 42 projects upwardly from the door 33 through the housing floor 73 by means of a housing floor slot 152 and is affixed to the carrier bar 151. Located directly beneath the carrier bar 151 is a slot cover bar 153 which makes a precise fit about the door hanger 42. Beneath the slot cover bar 153 is a slot cover channel 154 which is slidably mounted atop the slot 152. The interaction of the cover bar 153 and the cover channel 154 maintains the housing floor slot 152 closed to access from the vicinity of the door 33. That is, at no time are the operative parts of the driving mechanism open to tampering by the prisoner or other unauthorized persons through the housing floor 73. Affixed to the housing floor is a track means 155 which is physically located between the door carrier bar 151 and the propelling bar 104. The track 155 is adapted to receive upon its top surface 156 the door carriage wheels 157. The wheels 157 are rotatably mounted upon suitable axles 158 so that they may roll along the surface 156 of the track. This allows the door 33 and its associated mechanism to be easily reciprocated from one side of the cell opening to the other.

The door carrier bar 151 is interconnected with the propelling bar 104 by means of a ball carrier transfer mechanism which includes a pair of ball carriers 161, 162 each having a ball transfer aperture 163, 164 respectively. The ball carriers are permanently mounted to the carrier bar 151 by a suitable nut and bolt combination 165. The ball carriers are so affixed to the carrier bar that when the door carriage wheels 157 are mounted on the track surface 156, the ball transfer aperture of the carriers lies adjacent the side of the track 155 that is in close proximity with the propelling bar.

The propelling bar 104 has an elongated shape with each forming a reentrant hook that includes a suitable space to receive the lock bar roller 52 therein. The lock bar roller 52 is adapted to roll along the unlocking camming surfaces 166, 167. When the lock bar roller 52 rests in the lower most camming surface **166*a*, 167*a*, the lock bar is in its most downward position and has the door locked in either the closed or open position. As is evident, when the propelling bar is reciprocated toward drive head 94, the lock bar roller 52 will move along the inclined camming surface 166*b* or 167*b*, thereby raising the lock bar 47 and performing the unlocking operation. As the propelling bar is reciprocated further, the roller 52 is then caused to move along the entire length of the roller surface 104*a* until the door comes to a halt, either at a midpoint of travel due to a blockage or at the end of travel. Within the face of the propelling bar which is adjacent the track 155, there are two elongated ball races 168, 169 which cooperate with the ball carriers and the track to effect movement of the door. The track 155 has near its remote ends ball seats 171, 172. When the drive head is caused to move, the propelling bar is reciprocated thereby carrying the balls 173, 174 half within their respective ball races and half within their respective ball carriers. The balls are carried in this manner until one is carried opposite its respective ball seat 171 or 172** at which time the continued movement of the propelling bar causes the ball to be displaced from the propelling bar and held in position by the ball carrier and the ball seat, one half of the ball being in each of the two latter members. The remaining ball then maintains its position in one half of its respective ball carrier and one half within the ball race of the propelling bar. The preciseness of operation of this system will later be seen in the description of operation.

In installations of the type contemplated by this invention, it is often necessary to stop the movement of the door, or at least cut off the power drive to the door at certain specific times. These times may occur when the door is in transit and becomes blocked either by design or accidentally. If the door becomes blocked, it is necessary that the electric motor be cut off to prevent its destruction from overheating. After the blockage is removed from the door, it is then very desirable to have the door immediately resume its intended direction of travel. It is also very necessary to provide means for opening the cell doors from a remote point in case of fire or other emergencies so that the prisoners may be quickly released from confinement. Therefore, this invention provides an emergency manual release mechanism 32 having at a remote location an emergency manual release lever 181 fixed to a lever pivot 182 that is rotatably mounted in suitable supports 183 at the top of the remote control housing 184. Also affixed to the lever pivot 182 is an index off bar pivot arm 185 having at its lower end a connecting rod 186 which interconnects index off arm 187 to the emergency manual release lever. The index off arm 187 extends along the inside rear wall of the housing 71 and is supported to the rear wall 74 by means of index off bar guide lugs 188. The index off bar has a pair of elongated cam apertures 189 through which the guide lugs 188 project. As can be seen, especially in FIGURE 18, the cam apertures 189 each have a sloping camming surface **189*a* and a horizontal slide surface 189*b*. The end of the index off bar remote from the remote control housing 184 is suitably interconnected with the next in-line off bar, associated with the adjacent cell, by an interconnecting turnbuckle 191**.

Positioned adjacent the index off bar are a pair of flat elongated members identified as door opening switch cut off bar 192 and door closing switch cut off bar 193. Each of the latter components have camming apertures 194 through which the guide lugs 188 project so as to permit the bars 192, 193 only the limited movement allowed by the apertures 194. These bars are maintained in operative relation upon the guide lugs 188 by means of a retaining washer 195. The switch cut off bars 192 and 193 are positioned so that they cooperate with the oppositely extending contact arms 196, 197 of the rocker arm 123 to effect operation of the blocked door limit switches 198, 199.

The limit switch 198 has an operating arm 201 which is adapted to be moved by pressure from the switch activator 202 as it moves in a vertical arc. The activator 202, as in fact the whole switch 198, is so positioned that it only operates when the door closing switch cut off bar 193 moves vertically thereby contacting the activator 202 which moves in its vertical arc to disengage the pressure plate 203 from the operating arm 201 which allows the switch to open the electrical circuit to the drive motor 76. The above chain of events occur only when the door is blocked during the door closing phase of travel, which, as will later be seen, causes the rocker arm 123 to pivot about rocker shaft 116 causing the contact arm 196 to strike the bottom surface of door closing switch cut off bar 193. This raises the bar 193 vertically along the guide lugs 188 so that the top surface of the bar impinges against activator 202 causing switch 198 to open the circuit to the motor. In a similar manner, the block door limit switch 199 is used when the door is in the phase of opening and is blocked during travel. Such operation causes the rocker shaft 116 to pivot the rocker arm 123 in a clockwise direction, as viewed in FIGURE 13, causing the contact arm 197 to strike against the door opening switch cut off bar 192. As cut off bar 192 travels vertically upward guided by lugs 188, it comes into contact with switch activator 204 and causes the activator to move in a vertical arc thereby moving pressure plate 205 to force the switch operating arm 206 to open the electrical circuit to the motor 76.

The cut off bars 192, 193 each have at one end screw holding lugs 207, 208 respectively. Through these lugs are respective brake adjusting screws 209, 211 which, when the respective cut off bars are moved vertically by the rocker arm 123, engage brake shoe 212 forcing it upwardly. Along the portion of the brake shoe 212 which is immediately beneath the coupling 77 is a suitable brake lining 213 which engages the coupling 77 when the brake shoe is moved in a vertical direction in the amount necessary to bring the brake lining in contact with the coupling. The end of the brake shoe remote from the cut off bars is maintained in position by brake rod 214 and properly tensioned thereupon by a brake tension spring 215. Therefore, it is obvious that when one or the other of cut off bars 192, 193 are moved vertically upon the door being blocked during travel, the brake shoe will move the brake lining into contact with the coupling 77 thereby stopping the drive screw 78 immediately upon the motor 76 being deenergized. This prevents any undue strain from being applied by the drive screw to the drive head.

If during an emergency it is desired to release the door from the drive head 94 when the door is in one of its end of travel positions which necessitates that the lock bar 47 be in a locking position, it is necessary that the drive head be reciprocated an amount that is equal to the distance needed to move the propelling bar 104 to perform unlocking. Therefore, the lock bar roller 52 must be completely cammed along the entire camming surfaces **166*b* or 167*b*, as the case may be. This allows the door to become unlocked in order that it may be freely reciprocated. To effect this procedure, there is provided along the bottom of the housing floor 73 adjacent the housing front 72 an upper emergency manual release bar 216 and a lower emergency manual release bar 217. The upper bar 216 is equipped with an upper emergency release bar lug 218 which projects upwardly from bar 216 and is so located along that bar that when the door is completely opened in the end of travel position, the manual release pin 219 of the drive head 94 is immediately adjacent the lug 218. Likewise, the lower emergency manual release bar 217 has an upwardly projecting lower bar lug 221 which is positioned immediately adjacent the manual release pin 219 when the door is completely closed in the end of travel position. Therefore, it can be seen that if the release bars 216, 217 are reciprocated in opposing directions, their respective lugs 218, 221 will strike a manual release pin 219 thereby moving the drive head 94 and causing the lock bar 47 to be positioned in the unlocked position. Which of the bar lugs 218, 221 strike the release pin 219 depends entirely upon the position of the door at the particular time. While it should be noted that the release bars 216, 217 are moved concurrently only one of the lugs 218, 221 will strike the release pin 219 because of the positioning at that time of the drive head 94 with respect to the lugs 218, 221**.

In order to reciprocate the release bars 216, 217, a pair of manual release bar lever arms 222, 223 are provided. Lever arm 222 interconnects with the upper emergency manual release bar 216 by means of a connecting rod 224. Lever arm 223 interconnects with the lower emergency manual release bar 217 by means of a connecting rod 225. Lever arm 222 is fixedly mounted to the lever pivot shaft 182 so that it moves arcuately upon movement of the pivot shaft 182. However, the lower emergency manual release bar lever arm 223 is pivoted about fixed pivot support 226 and also is pivoted to lever arm 222 at pivot point 227.

To activate the emergency manual release mechanism 231, emergency manual release lever 181 is pivoted at the remote control station along a quadrant 228 having a number of stop positions 231, 232 therein. Stop position 231 allows for selective cell door operation by an authorized person in a manner not disclosed herein. As the release lever 181 is pivoted to full emergency stop position 232 allowing the lock pin 233 to be engaged therein, the entire emergency manual release mechanism is activated.

Figure 14:
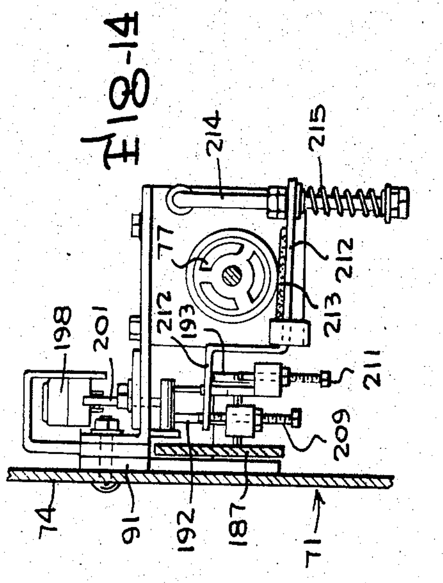
FIGURE 14 is a vertical section view taken along lines 14—14 of FIGURE 13, showing the operation of the motor brake.
Figure 12:
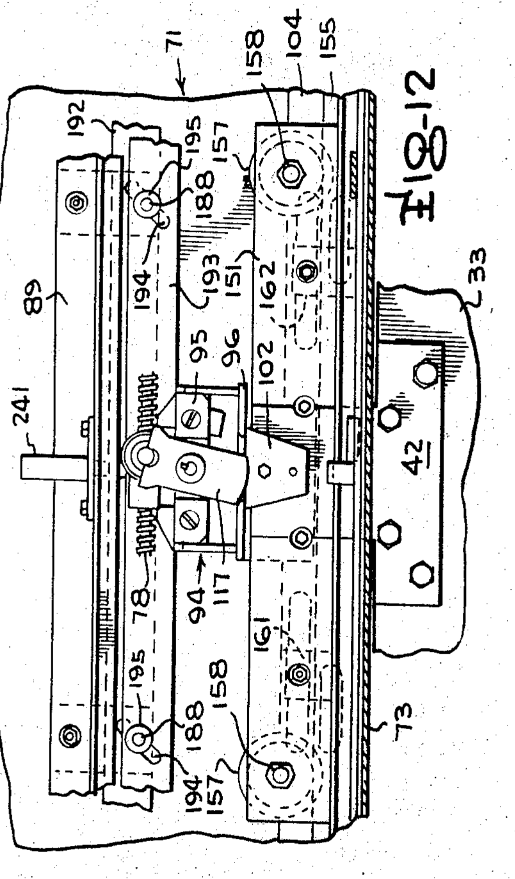
FIGURE 12 is a fragmentary front elevation view similar to that of FIGURE 9; however, showing the door in the travel mode of operation to the open position and having been blocked before completing full travel.
Figure 13:
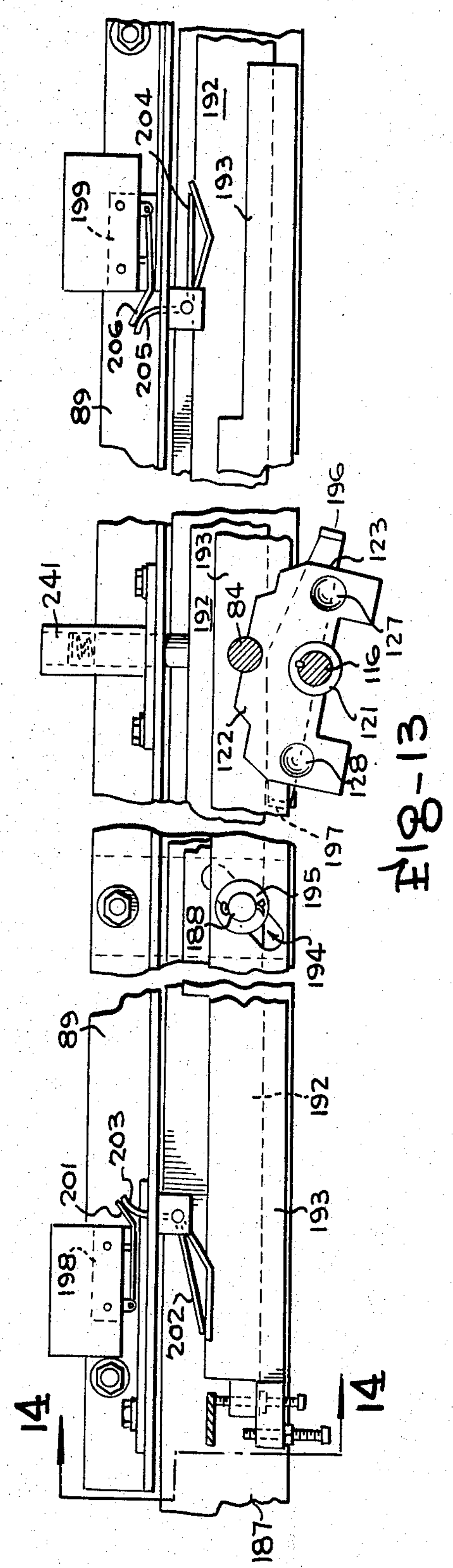
FIGURE 13 is a fragmentary horizontal section view similar to that of FIGURE 11; however, showing the mechanism after the condition of FIGURE 12 has been effected.
Figure 16:
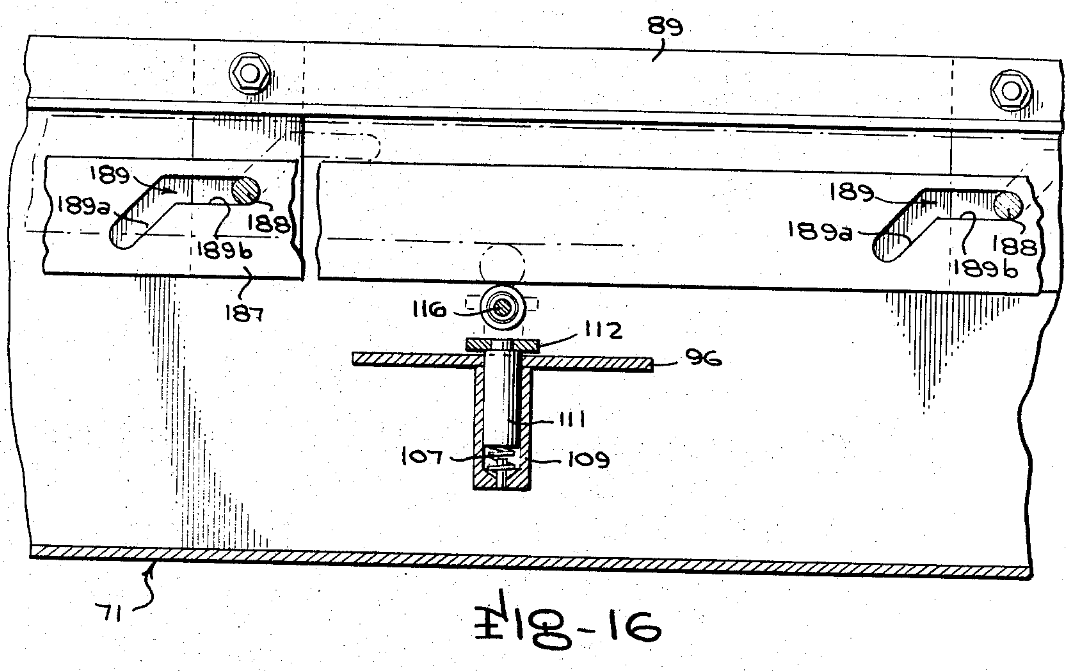
FIGURE 16 is a vertical section view taken along lines 16—16 of FIGURE 15.
Figure 15:
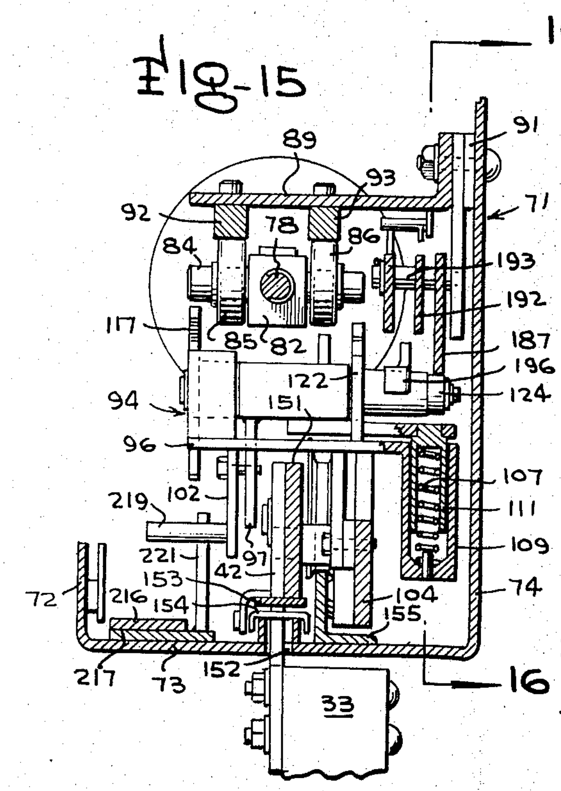
FIGURE 15 is a fragmentary section view similar to that of FIGURE 4; however, showing the operation of the index off bar in releasing the drive head from engagement with the drive screw.
Figure 17:
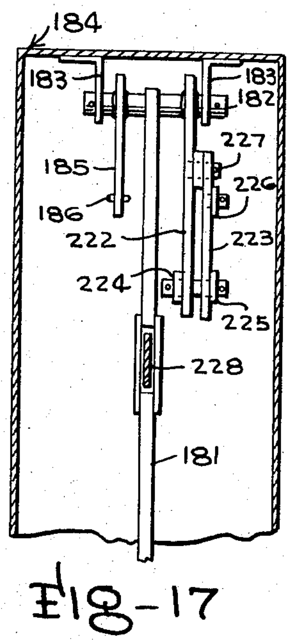
FIGURE 17 is a vertical section view taken along lines 17—17 of FIGURE 1.

In discussing the operation of the present invention let it be assumed that the operative parts are in the position shown by FIGURE 1, wherein the door 33 is in a closed and locked position with the lock bar 47 fully locking the door in the manner previously described. The emergency manual release mechanism 32 should also be in the position shown in FIGURE 1. With these conditions, if it is desired to operate the door 33 to an open position, the electric motor 76 would be energized from a suitable control panel (not shown) and its power will be transferred to the coupling 77 and thence to the drive screw 78. Since the motor 76 is a reversible type in order to open the door 33, the motor must be run in the correct direction of rotation to effect this movement. Once the drive screw 78 begins turning the drive screw nut 82 follows the moving threads of the screw and this motion is then transferred to the drive head 94. Since the propelling bar 104 is affixed to the drive head, it will also begin to move and, when it does, the lock bar roller 52 will move upwardly along the camming surface **167*b* to effect the vertical withdrawal and unlocking of the lock bar 47. At this time the roller 52 is positioned upon the top surface 104*a* of the propelling bar and the ball 174 has moved to the trailing edge position of the ball race 169. The ball 173 is still positioned one half within the ball aperture 163 of the ball carrier 161 and one half within the ball seat 171 of the track 155. When the ball 174 reaches the trailing edge position indicated by numeral 234 of the ball race 169, the door carrier bar 151 is caused to move concurrently with the propelling bar. This is because ball 174 interconnects ball carrier 162 with the propelling bar by means of the ball race 169. As the door reaches its end of travel position at the door open position, ball 174 is forced out of the ball race 169 and is positioned one half within the ball seat 172 of the track. At this point, the door is fully open, however, it is still unlocked. When the door comes to a stop the propelling bar still travels a certain distance thereafter so that the roller 52 of the lock bar 47 follows the camming surface 166*b* and is then positioned upon surface 166*a*. When the roller rests on surface 166*a* the lock bar is in a locked position once again, and the door 33 cannot be manually reciprocated. When the lock bar is in its locked position, the propelling bar is brought to a halt by ball 173 becoming positioned at trailing edge 235 of ball race 168. At this time the motor 76 is taken out of the circuit to prevent it from becoming overheated since its rotor can no longer turn because of the locked condition of the door. This is accomplished by providing an end of travel limit switch strike pin 236 projecting outwardly from the top surface 167***a* of the propelling bar. This strike pin is adapted to contact an end of travel limit switch 237. This switch automatically turns off the motor 76 when the door has reached the opened, locked position. Likewise, when the door is in a closed, locked position, a similar end of travel limit switch strike pin 238 contacts an end of travel limit switch 239 to effect cut off of motor 76 in that position. If it is desired to operate the door back to a closed, locked position, the procedure is merely reversed of that just described. If the door is being operated from one end of travel position to the other and a blockage occurs, the operative parts of the driving mechanism would take the positions as shown in FIGURES 12, 13 and 14. In this situation, it is desired to immediately shut off motor 76 and to lock the door in the blocked position until the blockage is removed. In this situation the door is being prevented from moving in its intended direction of travel, yet the drive screw 78 is continuing to impart driving force to the drive screw nut 82. This causes the trunnion shaft 84 to pivot the uppermost portions of the drive rocker 117 and the oscillating rocker 122 in a direction corresponding with the direction of travel of the door.

As the rocker shaft 116 is pivoting causing the stub shaft 121 also to rotate, the rocker arm 123 is pivoting in a direction to cause the contact arm 197 to pivot in an arc corresponding with the direction of travel of the door. As the contact arm 197 pivots upwardly, it makes contact with the under surface of door opening switch cut off bar 192 causing it to rise vertically along index off bar guide lugs 188. As the bar 192 moves upwardly, it contacts blocked door limit switch 199 causing the switch to open, thereby opening the circuit to the drive motor 76 and stopping rotation of the drive screw 78. To apply a greater resistance to the blocked door and preventing it from being reciprocated at this time, the cut off bar 192 also strikes upwardly against the brake shoe 212 through the brake adjusting screw 209 which causes the brake lining 213 to engage the coupling 77. This locks all of the operative parts in the positions shown in FIGURES 12, 13 and 14, and maintains them in this position until the blockage is removed from the door at which time the door will then reciprocate slightly toward the open position of its own accord to release the pressure exerted by the trunnion shaft 84 upon the drive rocker 117 and the oscillating head rocker 122. When this occurs the rocker arm 123 also pivots to its normal rest position thereby disengaging the contact arm 197 from the underside of the cut off bar 192. This in turn releases the brake lining 213 from engagement with the coupling 77 and also allows the limit switch 199 to close once again, thereby supplying power to the drive motor which then continues reciprocating the door in the original direction until it comes to the end of travel in the opened and locked position.

As the door is travelling from the opened position to the closed position and a blockage occurs, the operative parts of the driving mechanism assume positions just opposite of those just described. In this situation, however, the trunnion shaft 84 will present pressure against the drive rocker 117 and the oscillating rocker 122 in a direction corresponding with the closing of the door. This will then pivot the upper most portions of the drive rocker and the oscillating rocker in a counter clockwise direction when viewed in FIGURES 12, 13 and 14 causing the rocker arm 123 to pivot in a similar direction to bring contact arm 196 against the underside of cut off bar 193, thereby raising cut off bar 193 into engagement with the blocked door closing limit switch 198 and positioning brake adjusting screw 211 against the brake shoe causing the motor 76 to immediately stop running and causing the drive screw to stop rotating. Once the blockage is removed, the door will then continue reciprocating to the closed position in the same manner as just described for when it is moving toward the opened position. As the blockage is removed from the door in each case, the reset spring assembly 241 pushes downwardly upon one of the cut off bars 192 or 193, as the case may be, and forces it away from the switch cut off position and returns it to the normal rest position.

In both cases of blockage in either direction of travel, the oscillating rocker balls 131, 132 are forced out of their ball detents 127, 128 respectively when the pressure of the pivoting oscillating rocker 122 overcomes the spring compression force against the balls. This system is provided so as to maintain a minimum amount of blockage force which the reciprocating door must come against in order to activate the blocked door cut off system.

At times when emergency conditions necessitate that all of the doors along a cell block front should be opened concurrently, the emergency manual release mechanism is then activated. With this mechanism all of the doors may be unlocked and partially opened from a remote position thereby leaving the doors in a state which the prisoner may reciprocate at will. As the emergency manual release lever 181 is operated, the lever pivot 182 is rotated thereby moving the index off bar pivot arm 185. This immediately sets into motion the index off bar 187 and forces the camming surface 189*a* to move along the guide lugs 188 in a downwardly and rearwardly movement. Since the lower surface of the index off bar 187 normally rides atop the roller 124 of the drive head, the downward movement of the index off bar forces the drive head body 95 downwardly thereby compressing the drive head bias spring 107. It should be noted that the drive head platform 96 and its associated structure remains in its normal horizontal plane and only the drive head body portion of head 94 at this time is moving. As the index off bar 187 continues to its full downward position, the drive head body 95 is moved downwardly to such an extent that the trunnion shaft notch 118 of the drive rocker 117 and the trunnion shaft 126 of the oscillating rocker 112 are disengaged from the trunnion shaft 84. When the index off bar reaches its terminal downward position, the trunnion shaft 84 no longer restricts reciprocative movement of the drive head 94. The door 33 is now free of the drive screw 78 and may be reciprocated at will, once the lock bar 47 is moved to the unlocked position.

As the emergency manual release lever 181 is being actuated, the lever pivot 182 is also pivoting the upper and lower emergency manual release bar lever arms 222 and 223 respectively. If the door 33 is at an end of travel position when the emergency manual release mechanism 32 is actuated, the manual release bars 216 and 217 are moved in opposite directions so as to carry the emergency release bar lugs 218, 221 toward the drive head. If the door is in a closed and locked position as indicated by FIGURE 1, the movement of the emergency manual release bars would bring lug 221 into contact with manual release pin 219 at the completion of the vertical portion of the travel that index off bar 187 performs. At this time the drive head 94 is disconnected from the drive screw 78 and the lug 221 strikes manual release pin 219. Upon such a happening, the lug 221 forces the drive head 94 and, consequently, the entire door 33 to reciprocate far enough so that the propelling bar 104 moves to raise the lock bar 47 and position it along top edge 104*a* of the propelling bar. Once this occurs, the emergency manual release 181 has reached its full emergency release operation position as indicated by numeral 232 on the quadrant 228. The door is now ready for manual operation whenever desired.

As should be noted, the door may be manually reciprocated; however, as long as the manual release lever 181 is in its full operating position, the position of the lugs 218 and 221 upon the emergency manual release bars prevent the door from being either fully closed or fully opened to such an extent that the lock bar 47 would be vertically moved to a locking position. During the unlocking phase of the emergency procedure, in the time period when lug 221 was striking release pin 219 and moving the drive head 94 the distance required to effect its being unlocked, the index off bar has continued moving toward the area of the remote control housing 184 by means of the horizontal camming aperture 189*b*. This maintains the required downward pressure upon the drive head 94 and maintains it disconnected from the trunnion shaft 84 and, consequently, the drive screw 78.

If is the door should be in the opened position rather than the closed position as has just been described, the operation would be similar upon the movement of the emergency manual release lever 181, except that the drive head 94 would be positioned in the vicinity of lug 218 of the upper emergency manual release bar 216. Therefore, lug 218 would strike manual release pin 219 of the drive head to effect unlocking of the vertical lock bar. Once the emergency condition has abated, the operator of the emergency manual release lever 181 would position this lever in its normal off position. This would then allow the motor 76 to be operated to drive the drive screw 78 and to allow the trunnion 83 to effect pick up of the drive head 94 and the door 33, regardless of where it should be positioned, at the time of the emergency condition.

While the discussion of the present invention has confined itself to one complete door mechanism, it should be obvious that the complete line of cells along a cell block front could be included in the system by merely extending the operative parts of the invention. This is easily seen in that the interconnecting turnbuckle 191 would connect with the index off bar of the next adjacent cell and that the emergency manual release bars 216, 217 would merely extend along the housing floor 73 in whatever length needed.

While we have particularly shown and described one particular embodiment of the invention, it is distinctly understood that the invention is not limited thereto but that modifications may be made within the scope of the invention and such variations as are covered by the scope of the appended claims.

What is claimed is:

1. A system for keyless and remote control operation of a series of sliding cell doors to automatically and selectively lock and unlock and impart closing and opening movement to each cell door individually, comprising a unitary power operated driving mechanism for each door including a screw shaft positioned above and extending across the door opening, a ball bearing drive screw nut and trunnion assembly mounted on the shaft for linear travel therealong when the shaft is rotated, reversible drive means directly coupled to the drive shaft for rotating it in either direction, means for activating the reversible means, a vertically movable locking bar mounted adjacent the door opening for movement to a locking position engaging the door when the door is in either its open or closed position and movable to a second position disengaged from the door to enable movement of the door, a driving head comprising a vertically movable body member movable between a first position in engagement with said trunnion assembly and a second position disengaged from said trunnion assembly and a support platform supporting said body member and including resilient means biasing the body member away from the support platform into engagement with the trunnion assembly, propelling means interconnecting the driving head with the cell door to effect reciprocative movement thereto and including camming means engageable with said locking bar to move said locking bar to effect locking and unlocking of the locking bar, limit switches at opposite ends of the door opening, means associated with the propelling means for operating the limit switches when the door has reached its end of travel position wherein the limit switches are so connected to stop the power operated driving mechanism, the constructinon and arrangement being such that when the remote control means is operated to activate the reversible drive means the drive screw nut and trunnion assembly will be caused to travel longitudinally along the screw shaft in one direction and actuate the propelling means thereby causing unlocking of the locking bar, the door will be propelled from its locked closed position to its locked open position and the propelling means will cause locking of the locking bar, and when the remote control switch is operated to cause the reversible drive means to rotate the screw shaft in the opposite direction the drive screw nut will be caused to travel longitudinally along the screw shaft and actuate the propelling means and cause unlocking of the locking bar, the door will be propelled to the closed position and the propelling means will effect locking of the locking bar and operation of the limit switches.

2. Apparatus as set forth in claim 1, wherein the propelling means comprises a propelling bar fixedly secured to the support platform, a door carrier bar spaced from the propelling bar and operatively interconnected therewith by motion transfer means, door hanger means fixed to the door carrier bar for supporting the door, and roller means integral with the door carrier bar for effecting movement of the door at predetermined times.

3. Apparatus as set forth in claim 2, wherein the propelling bar has first and second locking bar camming surfaces interconnected by a roller track whereby as the propelling bar is caused to reciprocate one of the locking bar camming surfaces operatively engages the locking bar to move it vertically thereby unlocking the door and permitting the propelling bar to reciprocate and maintains the locking bar in the raised vertical position upon the roller track until the other locking bar camming surface forces the locking bar into the locking position.

4. A system for keyless and remote control operation of a series of sliding cell bores to automatically and selectively lock and unlock and impart closing and opening movement to each cell door individually, comprising a unitary power operated driving mechanism for each door, reversible means for operating the door in either direction, remote control means for activating the reversible door operating means, a vertically movable locking bar mounted for movement adjacent the door opening for engaging the door when the door is in either its open or closed position and for movement to a second position allowing the door to be moved, a driving head mounted for movement on a support platform between first and second positions respectively engaged and disengaged with said driving mechanism, means interconnecting the driving head with the cell door to effect reciprocative movement thereto and including camming means engageable with said locking bar to move said locking bar to effect locking and unlocking of the locking bar pivotable means on said driving head sensitive to blockage of said door to move into engaging position with switch actuating means connected to switch means for disconnecting power from said reversible means so that said blockage of said door causes power to said reversible means to be interrupted.

5. A system for keyless and remote control operation of a series of sliding cell doors to automatically and selectively lock and unlock and impart closing and opening movement to each cell door individually, comprising a unitary power operated driving mechanism for each door including a screw shaft positioned above and extending across the door opening, a ball bearing drive screw nut and trunnion assembly mounted on the shaft for linear travel therealong when the shaft is rotated, the trunnion assembly including a horizontally disposed trunnion shaft, reversible drive means directly coupled to the drive shaft for rotating it in either direction, means for activating the reversible means, a vertically movable locking bar mounted adjacent the door opening which when in a lowered position engages the door to prevent door movement but when in a raised position enables door movement, a driving head in driving engagement with the trunnion assembly, propelling means interconnecting the driving head with the cell door to effect reciprocative movement thereto and to effect locking and unlocking of the locking bar, means to sense a blockage within the line of travel of the door when the door engages the blockage comprising, a driving head rocker assembly including a drive rocker and an oscillating rocker interconnected by a rotatable rocker shaft supported by the driving head, the drive rocker and the oscillating rocker each having a trunnion shaft receiving notch in operative engagement with the trunnion shaft, and means responsive to the driving head rocker assembly adapted to cease operation of the reversible drive means and to lock the door against further travel until the blockage is removed.

6. Apparatus as set forth in claim 5, wherein the means to cease operation of the reversible drive means and to lock the door against further travel comprises a selectively operating rocker arm mounted for movement with the rocker shaft, a plurality of operating members responsive to selective movement of the rocker arm to stop and lock the reversible drive means upon the door being blocked during travel, the construction and arrangement being such that when the door becomes blocked during travel the moving trunnion assembly causes the rocker assembly to pivot from a driving position to a pivoted position about the axis of the rocker shaft in the original direction of movement of the door thereby selectively engaging the rocker arm with one of the operating members so as to stop and lock the drive means until the blockage is removed at which time the rocker assembly pivots back to the driving position so that the drive means is operable to drive the door in the original direction.

7. A system for keyless and remote control operation of a series of sliding cell doors to automatically and selectively lock and unlock and impact closing and opening movement to each cell door individually, comprising a unitary power operated driving mechanism for each door including a screw shaft positioned above and extending across the door opening, a ball bearing drive screw nut and trunnion assembly mounted on the shaft for linear travel therealong when the shaft is rotated, reversible drive means directly coupled to the drive shaft for rotating it in either direction, means for activating the reversible means, a vertically movable locking bar mounted adjacent the door opening which when in a lowered position engages the door to prevent door movement but when in a raised position enables door movement, a driving head adapted for operation with the driving mechanism, propelling means interconnecting the driving head with the cell door to effect reciprocative movement thereto and to effect locking and unlocking of the locking bar, the driving head comprising a vertically movable body member adapted for selective engagement and disengagement with the trunnion assembly, a support platform operatively associated with the body member and the propelling means, resilient means biasing the body member away from the support platform and into engagement with the trunnion assembly, remotely controlled emergency manually operable means for simultaneously and collectively operating all of the doors including a remotely operated strike bar, the strike bar adapted to be moved downwardly against the movable body member thereby compressing the spring means and forcing the body member vertically downward and disengaging the body member from the trunnion assembly for permitting manual operation of the doors without moving the driving mechanism.

8. Apparatus as set forth in claim 7, wherein the remotely controlled emergency manually operable means include oppositely movable emergency manual release means each having an upstanding strike lug thereon adapted for engagement with the driving head during movement of the manual release means to move the propelling means a sufficient distance to effect unlocking of the locking bar.

9. A system for keyless and remote control operation of a series of sliding cell doors to automatically and selectively lock and unlock and impart closing and opening movement to each cell door individually, comprising a unitary power operated driving mechanism for each door, reversible means for operating the door in either direction including an electric motor and an electric current source to energize the electric motor, remote control means for activating the reversible door operating means, a vertically movable locking bar mounted adjacent the door opening for movement into engagement with the door to lock the door when the door is in either its open or closed position and for movement to a second position disengaged from the door to enable the door to be moved, a driving head connected with said door and mounted for movement to a first position in engagement with the driving mechanism and to a second position disengaged from the driving mechanism, a carrier bar connecting the driving head with the cell door to enable movement of the cell door when the driving head is in its first position and including cam means engageable with the locking bar to effect locking and unlocking movement of the locking bar, pivotable switch actuating means to sense a blockage within the line of travel of the door when the door engages the blockage to interrupt the flow of electric current to the electric motor in response to the sensing of such blockage.

References Cited

UNITED STATES PATENTS

| | | | |
|---|---|---|---|
| 2,262,674 | 11/1941 | Hart et al. | 49—20 |
| 2,792,917 | 5/1957 | Smith et al. | 49—18 X |
| 2,837,182 | 6/1958 | White | 49—18 |
| 3,271,901 | 9/1966 | Bednar | 49—18 X |

FOREIGN PATENTS

| | | |
|---|---|---|
| 294,099 | 9/1916 | Germany. |

DAVID J. WILLIAMOWSKY, *Primary Examiner.*

J. KARL BELL, *Assistant Examiner.*